United States Patent [19]

Bergman

[11] Patent Number: 4,503,347
[45] Date of Patent: Mar. 5, 1985

[54] THERMALLY PROTECTED DYNAMOELECTRIC MACHINE AND METHOD OF ASSEMBLY

[75] Inventor: Ernest R. Bergman, Rossburg, Ohio

[73] Assignee: Copeland Corporation, Sidney, Ohio

[21] Appl. No.: 360,200

[22] Filed: Mar. 22, 1982

Related U.S. Application Data

[63] Continuation of Ser. No. 70,325, Aug. 27, 1979, abandoned.

[51] Int. Cl.³ .................................... H02K 11/00
[52] U.S. Cl. ................................. 310/68 C; 310/42; 310/43; 310/71; 310/89; 310/91; 310/260
[58] Field of Search ............. 310/68 R, 91, 194, 68 C, 310/71, 43, 89, 157, 260, 42; 361/20, 22, 23–25; 318/473; 174/138 G

[56] References Cited

U.S. PATENT DOCUMENTS

| | | | |
|---|---|---|---|
| 2,682,005 | 6/1954 | Hemphill | 310/68 R |
| 3,010,401 | 11/1961 | Granquist | 310/68 C |
| 3,183,383 | 5/1965 | Slonneger | 310/68 R |
| 3,222,555 | 12/1965 | Snoberger | 361/22 |
| 3,319,096 | 5/1967 | Eberhart | 310/68 R |
| 3,351,790 | 11/1967 | Linkous | 310/68 R |
| 3,875,439 | 4/1975 | Roach | 310/68 C |
| 4,004,169 | 1/1977 | Charlton | 310/71 |
| 4,061,935 | 12/1977 | Kandpal | 310/68 C |
| 4,181,393 | 1/1980 | Lill | 310/68 C |
| 4,236,092 | 11/1980 | DiFlora | 310/68 C |
| 4,292,555 | 9/1981 | Schaefer | 310/68 C |

Primary Examiner—R. Skudy
Attorney, Agent, or Firm—Harness, Dickey & Pierce

[57] ABSTRACT

A hermetic motor-compressor has a motor cover or shroud overlying the end turns of the motor windings. The motor cover is secured to a fastening device in the form of a ring held in place by the stator fastening bolts. A molded plastic holder or retainer for a motor protector is fitted on a lug formed on the ring. The retainer is adapted to hold protectors of different physical configurations. The lug projects upwardly inside the cover and in one embodiment the retainer is trapped between and held in position by the ring and the cover. The protector is of the thermally responsive electrical cutout type and is maintained in closely overlying heat conductive relationship with respect to the end turns of the motor windings by the motor cover. The parts which hold the retainer and the protector in place are movable into their holding positions by the act of moving the cover down into position, in a direction generally parallel to the axis of the motor.

13 Claims, 18 Drawing Figures

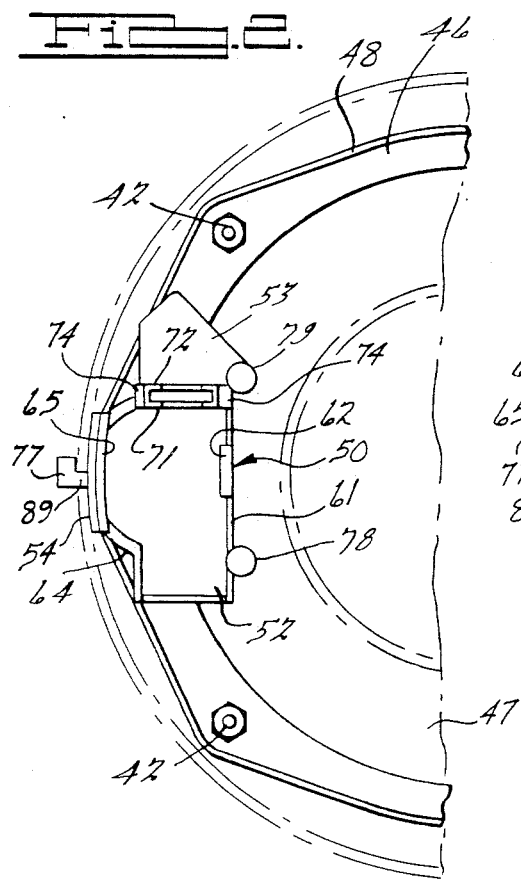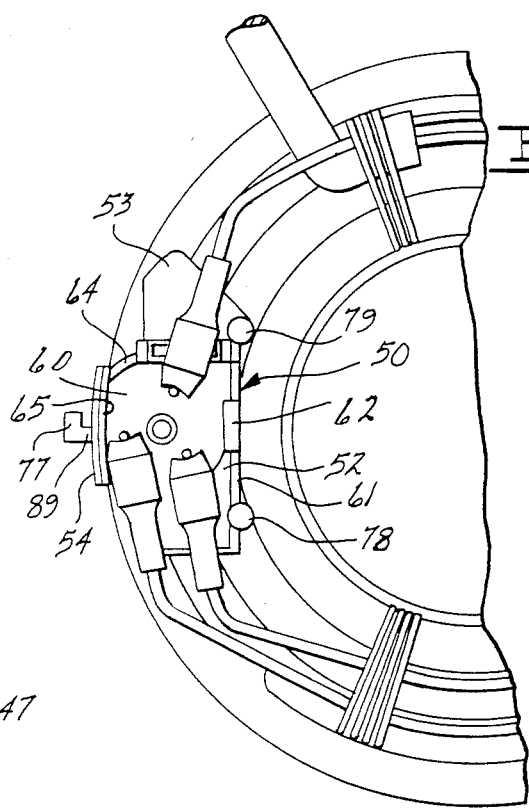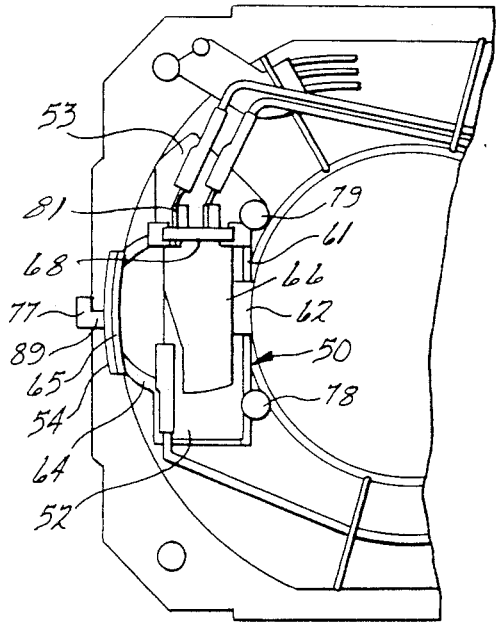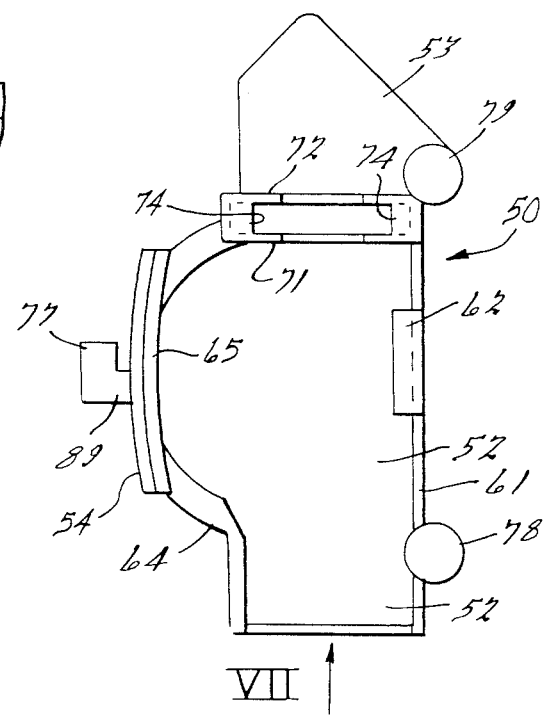

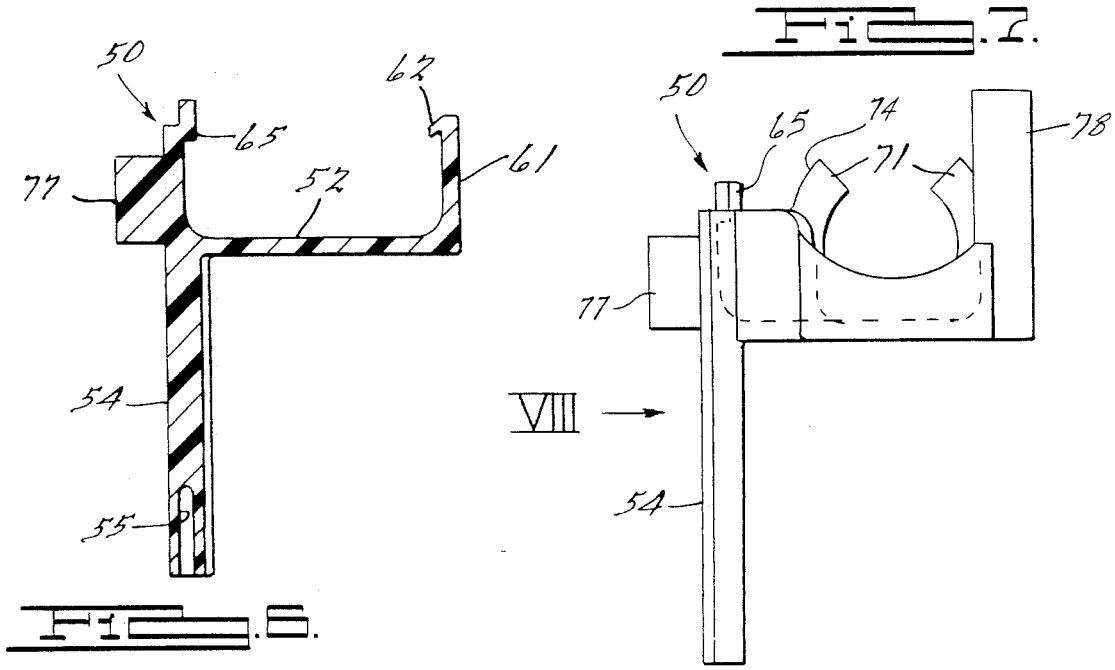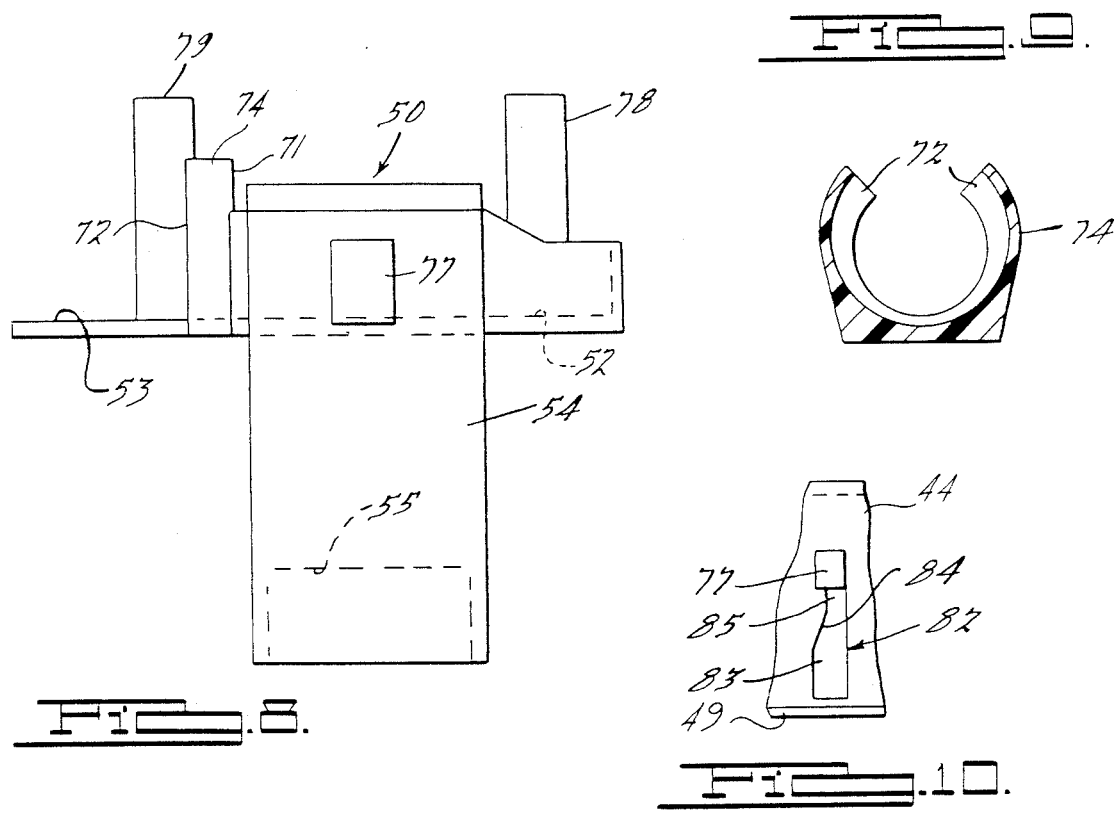

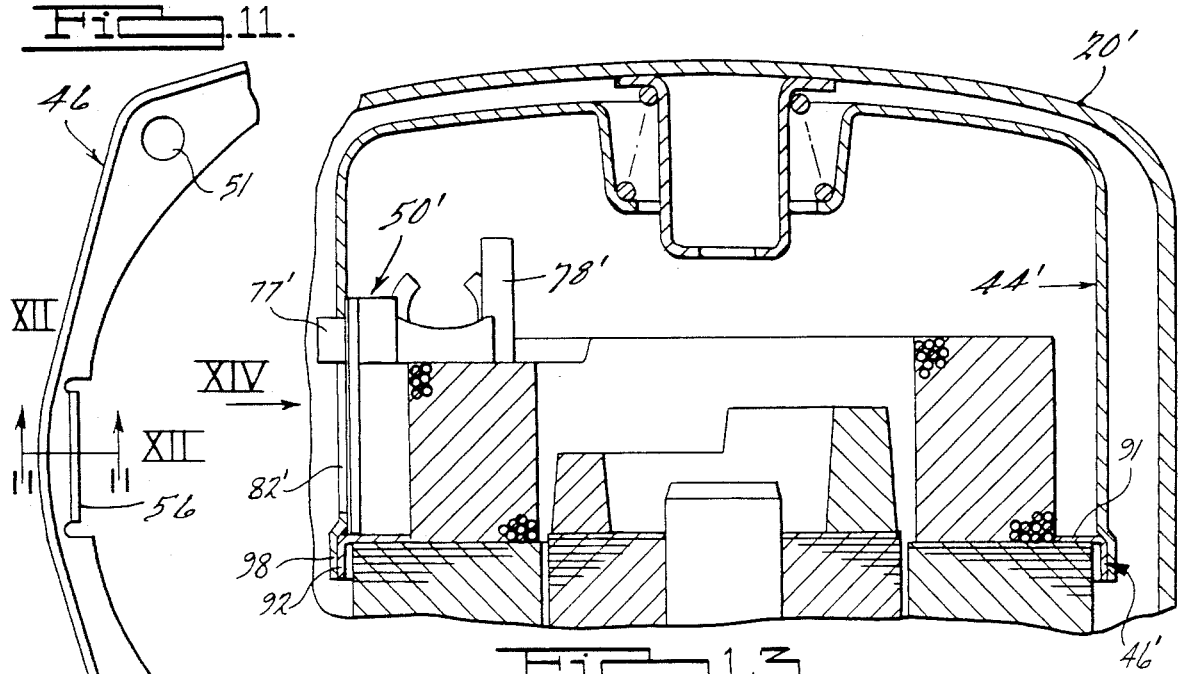
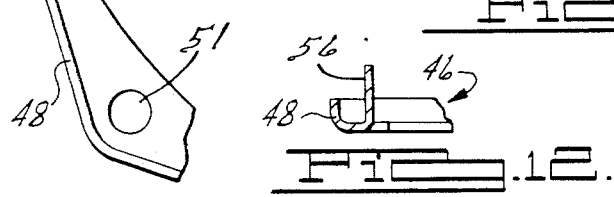
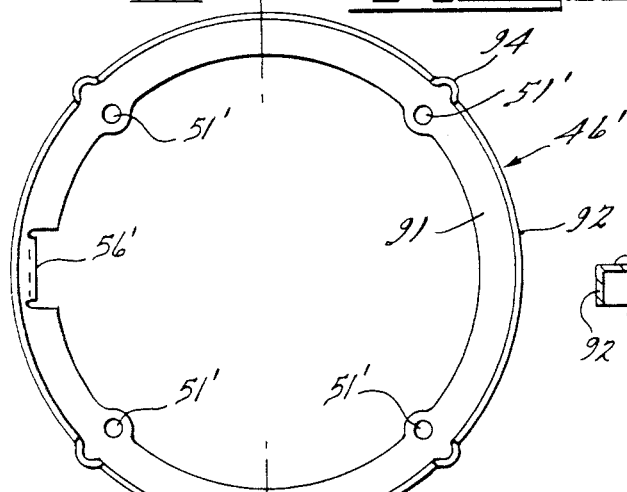
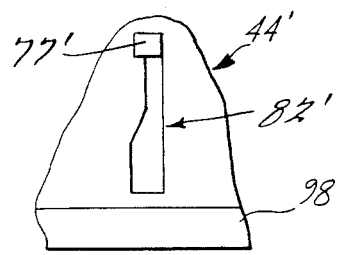
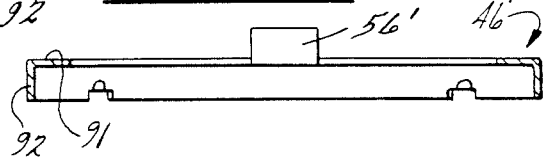
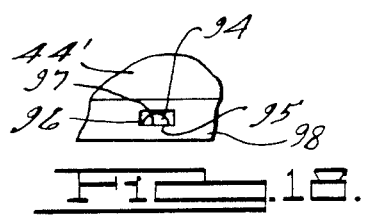
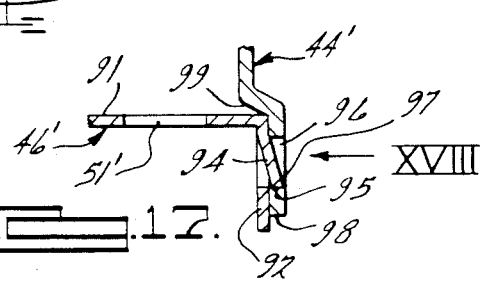

THERMALLY PROTECTED DYNAMOELECTRIC MACHINE AND METHOD OF ASSEMBLY

This is a continuation of application Ser. No. 70,325, filed Aug. 27, 1979 now abandoned.

BACKGROUND OF THE INVENTION

A widely used type of refrigeration compressor consists of a motor-compressor assembly having a vertical shaft, the motor being at the top and the assembly being enclosed in a hermetically sealed container or "shell". It is common to provide for protection against burnout of the electric motor by means of a thermally responsive protector which interrupts the motor circuit in the event of overheating. It has long been recognized as desirable to mount the protector appurtenant to the end turns of the stator winding of the motor, since this area heats quickly in event of an overload. Various protector mounting arrangements have been employed in an effort to achieve maximum efficiency while minimizing disadvantageous factors. In assembling such motor compressors, the motor stator is positioned on top of and bolted to the frame of the compressor. The air gap between the armature and stator is adjusted and fixed during assembly of the unit, then the bolts or machine screws which hold the stator in such position are tightened. Thereafter the shims are of course removed. For reasons connected with the operation of the refrigeration system, modern units of the indicated character also incorporate a sheet metal shroud or cover secured to the upper end of the motor within the shell, overlying the end turns and the protector. It is advantageous to secure such shroud or cover by means of the same screws or bolts which are used to secure the stator to the frame, not only for the sake of economy, but because the bolts or screws which secure the stator are heavy, well-secured, and virtually free of any possibility of breakage or loosening under the recurrent vibration encountered during the long service life expected of these units.

Inasmuch as the protector must be installed before the internal motor cover or shroud is applied, difficulty has been encountered in mounting the protector in the most advantageous position, and thereafter securing the shroud, without disturbing the air gap and without resorting to a plurality of smaller separate screws or fasteners for the cover. The overall objective of the present invention is to provide an improved system for mounting such a thermal protector and motor cover or shroud in a compressor unit of the indicated type. A related object is to provide such an improved mounting system which can be quickly and easily installed, and supported in a positive manner, after the gap between the rotor and stator of the motor has been adjusted and the stator has been permanently fixed in position. Another related object is to provide such an improved mounting means which reduces labor costs and minimizes the danger of improper installation by virtue of the fact that the protector unit and its supporting means can be easily, quickly and positively locked in place by the simple act of pushing the motor cover into position. A further object resides in the provisions of a protector retainer which will accomodate a number of different types of protectors.

Other objects and advantages will become apparent to persons skilled in the art upon consideration of the present disclosure in its entirety.

BRIEF DESCRIPTION OF THE DRAWINGS

FIG. 2 is a fragmentary sectional plan view taken subtantially on the line II—II of FIG. 1 and looking in the direction of the arrows, with motor compressor portions omitted;

FIG. 3 is a view similar to FIG. 2 showing a motor protector installed in the retainer and indicating related electrical connecting and motor winding elements;

FIG. 4 is a view similar to FIG. 3 showing a motor protector of a different type installed in the retainer;

FIG. 5 is an enlarged plan view of the retainer;

FIG. 6 is a shallow cross sectional view of the motor protector retainer, taken on the line VI—VI in FIG. 5;

FIG. 7 is an end elevation of the motor protector retainer taken as indicated by the arrow VII in FIG. 5;

FIG. 8 is a side elevational view of the motor protector retainer taken as indicated by the arrow VIII in FIG. 7;

FIG. 9 is a detailed shallow sectional view taken substantially on the line IX—IX of FIG. 5;

FIG. 10 is a fragmentary side-elevational view taken as indicated by the arrow designated X in FIG. 1;

FIG. 11 is a fragmentary plan view of the fastening ring for the motor cover;

FIG. 12 is a cross-section taken substantially on the line XII—XII of FIG. 11 and looking in the direction of the arrows;

FIG. 13 is a view corresponding to the upper portion of FIG. 1 showing a modified construction;

FIG. 14 is a fragmentary elevational view taken as indicated by the arrow designated XIV in FIG. 13;

FIG. 15 is a bottom plan view of the cover securing ring of the embodiment of FIG. 13;

FIG. 16 is a cross-sectional view taken substantially on the line XVI—XVI of FIG. 15 and looking in the direction of the arrows;

FIG. 17 is a detailed vertical sectional view showing motor cover securing portions; and FIG. 18 is a fragmentary elevational view of one of the cover retaining positions, corresponding to a view taken as indicated by the arrow XVIII in FIG. 17.

DETAILED DESCRIPTION OF PREFERRED FORMS OF THE INVENTION

Figure 1:
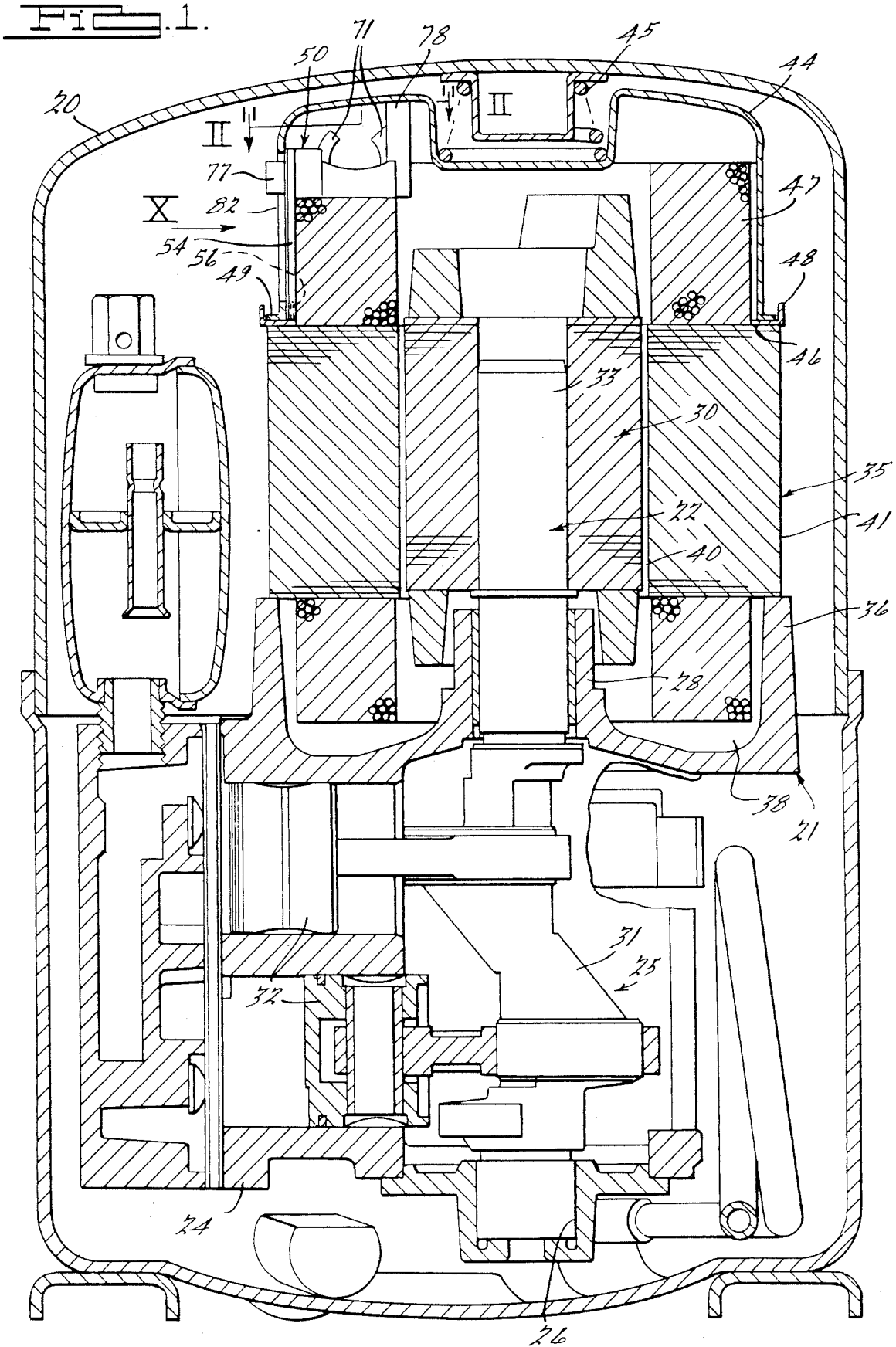
FIG. 1 is a somewhat diagrammatic vertical cross-sectional view of a hermetic refrigeration motor compressor incorporating the principles of the present invention with the motor protector omitted.

The assembly shown in FIG. 1 is a motor-compressor of a type well known in the refrigeration trade and which is commonly referred to as a hermetic refrigeration compressor. The hermetically sealed container or shell is a sheet metal enclosure generally designated 20 within which the motor compressor mechanism is supported with its common shaft 22 arranged on a vertical axis. The main supporting frame 21 of the mechanism is cast integrally with the cylinder block portion 24 of the compressor section, which is generally designated 25. The shaft 22 is journaled at its lower end in a bearing portion 26 secured to the bottom of the main frame, while a portion of the shaft directly above the compressor section is journaled in the bearing boss 28 which is integral with the compressor frame. As is common, the lower portion 31 of the shaft 22 is in the form of a crankshaft for actuating in conventional fashion the compressor pistons 32, while a portion 33 of the shaft extends above the bearing boss 28 and carries fast thereon the rotor 30 of an electrical motor.

The stator 35 of the motor is supported on an annular upstanding flange 36 integral with the frame and outspaced from the bearing boss 28 to provide an annular pocket 38 into which lower extremities of the rotor end of stator field winding may project in the usual manner. The stator is supported on the flange 36 by means of the field iron assembly 41 which constitutes the stator core. The field iron assembly overlies and rests on the flat top of the flange 36, as shown in FIG. 1. Long machine screws 42 which extend into suitably tapped holes (not shown) in the frame clamp the stator to the frame. Sufficient clearances are provided in the stator securing means to permit the stator to be shifted laterally on flange 36 sufficiently to adjust the gap 40 between the rotor and stator, whereafter, by tightening the screws 42, the stator is secured. It is common to insert shims between the rotor and stator from the upper end, or to use a self centering mandrel, to establish the gap prior to tightening the screws 42.

An internal cover or shroud 44 of sheet metal overlies the upper end of the motor to confine and control the flow of suction gas in a manner which assists cooling, and to provide a seat for the upper mounting spring 45. As disclosed in the co-pending application of Mahendra Lal, Ser. No. 10,749, filed Feb. 9, 1979, now abandoned, a continuation of Ser. No. 767,325, filed Feb. 10, 1977 (now abandoned), the shroud 44 is attached to the motor stator by means of a fastening ring 46 which encircles and rests upon the top of the stator iron outside the projecting winding portion 47 and is held in place by the motor mounting screws 42, the shroud 44 being in turn secured to the ring 46 by deforming rim or flange tab portions 48 of the ring to overlie a bottom flange 49 of the shroud. Such installation of the cover is effected after the air gap has been established and the stator securing screws have been tightened, as brought out in the aforementioned Lal application, which eliminates need for any additional small fasteners for the cover.

It will be recognized that components thus far described, being already known and/or developed by others, do not form a part of the present invention except to the extent that they relate to the problem dealt with.

It is the practice to equip the motors of such refrigeration equipment with means for interrupting the motor circuit in event of a malfunction which causes the motor to overheat. It has been recognized that placing a thermally responsive circuitbreaker in heat conductive relationship to the end turns 47 provides most effective protection and various means for mounting such a circuitbreaker have been employed.

In accordance with the present invention a holder or retainer is provided which is adapted to position commercially available types of circuitbreakers or "protectors" in position to quickly respond to an undue rise in the temperature of the stator field winding. The holder, which is generally designated 50, is molded of a suitable heat-resistant plastic. Its construction is best shown in FIGS. 2 and 5-9. The holder 50 has a relatively thin flat shelf portion 52 which is adapted to closely overlie and preferably engage a part of the end turn winding. Holding or retaining portions integral with the shelf portion are designed to retain protector units of differing shapes. Molded integrally with the shelf is a supporting side portion in the form of a leg generally designated 54, the lower end of which has a downwardly opening pocket 55 therein adapted to be overfitted upon an upwardly projecting tongue 56 integral with the ring 46. Tongue 56 is positioned inwardly from but close to the inner surface of the shroud 44 so that when the shroud is installed the outer surface of leg 54 lies closely against the inner wall of the shroud. When the holder is supported on the tongue 56 in the vertical position, as shown in FIG. 1, the shelf 52 extends inwardly closely overlying the winding, as indicated.

The shelf 52 is surrounded by upstanding walls which are contoured to assist in retaining a number of different types of circuitbreakers. The radially inner wall 61 is relatively straight and provided with an inwardly directed hooked portion 62 adapted to overlie and assist in retaining a circuitbreaker as 60 (FIG. 3) of the type which is constructed as a cylinder which is short in its axial direction and intended to be installed with the flat bottom portion of the cylinder horizontal. The wall 64 opposite the wall 61 is bulged radially outwardly to accommodate the relatively large diameter of the circuit-breaker or protector unit 60 and carries an inwardly flanged retaining portion 65 which cooperates with the hooked portion 62 to retain the unit 60.

At one end of the shelf portion 52 the retainer is provided with integral wall portions adapted to function as friction retaining means for a protector unit or circuit-breaker of the type illustrated in FIG. 4 at 66 which is in the form of a cylinder of smaller diameter and greater length intended to be installed with its axis horizontal and which has a radially extending base flange 68. The retainer 50 is formed of a plastic material which is sufficiently resilient so that the base flange 68 of a protector of the general shape indicated at 66 can be forced into the friction retaining means above alluded to, which friction retaining means consists of vertical walls 71, 72 upstanding from one end of the floor 52 and spaced apart a distance slightly exceeding the width (axial length) of the flange 68, which walls, viewed from the end as in FIGS. 7 and 9, are partly circular, joined at their peripheries by a cylindrical wall 74, and spaced sufficiently at the top to permit the flange 68 to be pushed downwardly therebetween and into the partly circular enclosure defined thereby, to retain the protector unit. The retainer will hold several different versions of each type of protector, providing size variances are minimal.

The outer wall of the leg 54 of the retainer 50 is provided with an integral laterally directed side abutment or hook portion 77 near its top. A pair of upstanding end abutment or post portions 78, 79 extend upwardly integrally from the inner wall 61. A continuation portion 53 of the shelf 52 extends outwardly beyond the wall 72 to shield the terminals, shown at 81 in FIG. 4, which provide electrical connections to the protector unit 66.

As shown in FIG. 10, the side wall of the shroud 44 is provided with a vertical slot 82 the lower portion 83 of which is wide enough to admit the hook 77, such wide portion 83 being joined by an inwardly inclined wall 84 to a narrower upper portion 85 which is narrower in a horizontal direction than the full width of the head or outer portion of hook 77, but slightly wider than the neck portion 89 of hook 77 which projects outwardly from the wall 54. The upper end of the slot 82 constitutes an abutment which prevents upward displacement of the holder and protector independently of the abutments provided by posts 78, 79 and the under side of the cover or shroud overengaged thereby.

In assembling the compressor, after the stator 35 has been positioned on the flange 36 of the frame, the shroud retaining ring 46 is placed on top of the field core iron assembly 41. The stator is then accurately positioned, whereafter the screws 42, which extend through the holes 51 in ring 46, are tightened to permanently attach both the stator and the retaining ring 46 in their final positioning. The protector retainer 50 is then installed on the tongue 56 in upright position, and the protector, typically of one of the configurations indicated at 60, FIG. 3 or 66, FIG. 4, is installed and connected. Thereafter, the shroud 44 is positioned over the motor with the wider portion 83 of slot 82 horizontally aligned with the hook 77, and the cover is moved laterally toward the wall 54 and then downwardly so that the hook 77 overhangs the sidewall of the cover with its neck portion 89 in the narrow portion 85 of the slot. When the shroud is moved downwardly fully, the flange 49 seats on the ring 46, and the rim portions 48 of the ring are then bent over and clinched on the rim flange 49 to intersecure the parts and hold the shroud 44 rigidly in position. At this time the top of the shroud closely overlies the abutment posts 78, 79, as best shown in FIG. 1. The retainer 50 is thus firmly held in closely overlying position with respect to the field winding. The construction permits removal of any rotor positioning device after tightening the screws 42 and before such attachment of the shroud 44. The shroud is simply moved downwardly in the manner described and fastened in position by integral portions of the ring and shroud. No small screws or fastening elements are required either for the shroud or for the retainer 50, so that the danger of failure due to loosening and/or dislodgment of small fasteners is eliminated, despite which the assembly operation is effected quickly and easily and in a manner which virtually eliminates any possibility of errors in the assembly operation. In the latter connection it will be observed that it is not possible to assemble the parts in an incorrect positioning.

It will be noted that the protector unit itself (e.g. 60, FIG. 3; 66, FIG. 4) is not directly engaged by the cover 44 or 44'. The cover only engages the abutment portions 78 and/or 77-89 of the plastic holder or retainer 50. Thus the cover is substantially insulated thermally from the protector unit itself by the plastic retainer and so cannot reduce the efficiency of the protector by direct heat conduction between the protector and cover.

In the modified construction shown in FIGS. 13-18 inclusive parts corresponding to those already described are designated by like reference characters primed, and many will require no redescription.

Both the shell 20' and the shroud or motor cover 44' extend higher above the monitor than in the first embodiment (necessary when using multi-phase motors), providing a vertical clearance for gas circulation, but which causes the top of the shroud to be spaced above the end abutment portions or posts 78', 79' of the protector retainer 50', so that in this embodiment the inner surface of the top wall of the shroud does not form a coacting retaining abutment as in the first embodiment. The protector retainer may be identical to that disclosed in connection with the first embodiment. The cover retaining ring 46' has a flat top flange 91 adapted to overlie the stator field iron and which is apertured as at 51' to admit the stator securing screws. A downturned cylindrical peripheral flange 92 on the ring closely surrounds the stator field iron when the ring is positioned with its flange 91 on top of the core stack as shown in FIG. 13. Four tongues 94 are pressed outwardly from the flange 92, incline outwardly and downwardly, and terminate in projecting flat bottom edges 95. In alignment with each of the tongues 94 the shroud 44' is provided with a slot 96 of a size and position to overengage one of the tongues 94. Slots 96 have flat bottom walls 97 which, when the shroud is pushed down into position underengage the bottom edges 95 of the tongues to secure the shroud.

As shown in FIG. 14, the shroud 44' is provided with a slot 82' similar and corresponding to the slot 82 of the first described embodiment. The upper end of the slot 82' closely overlies the top of the side abutment or neck of the hook 77' to form the abutment which holds the protector retainer 50' down against the winding. Although the posts as 78' are not closely overengaged by the top of the cover 44', it has been found that the slot 82' is effective to position the retainer 50'.

In assembling the modified construction the procedural steps correspond to those described in connection with the first embodiment, except that no final clinching operation is required. The shroud 44' is sufficiently resilient so that it can be snapped down into position so that its openings 96 overengage the retaining tongues 94, which intersecures the ring and shroud and firmly lock the shroud in position. It will be noted that the lower rim of the cover or shroud 44' is provided with an outwardly stepped, swaged or deformed cylindrical flange portion 98 in which the slots 96 are pierced. The outwardly stepped configuration imparted to the lower rim of the cover by the flange 98 establishes a shoulder 99 which, when the shroud is locked in position, overlies the top flange 91 of ring 46', limiting downward movement of and assisting in locking the shroud in position.

The retainer disclosed is designed for use with both types of motor-compressors illustrated, i.e., those having different motor cover heights and winding heights. Common tooling may be used to form slots 82 and 82'. In such case, the slot is designed to have a height which will function to hold the retainer downwardly against the windings in the embodiment the of FIG. 13, because in this embodiment, posts as 78', do not engage the cover. The windings in the embodiment of FIG. 1 are shorter, so that the slot would not, in such case, perform the hold-down function. However in FIG. 1 the slot is shown as of such length that both the posts 78, 79 and the neck 89 of hook 77 engage the cover in such manner as to accomplish this function. If desired, the slot in any given design can be dimensioned so that both it and the posts provide the hold-down function.

Although the invention has been illustrated and described in connection with a refrigeration motor-compressor assembly and in a unit having its axis vertical, it will be recognized that the principles of the invention are applicable to various dynamoelectric machines employed in different fields of use and which have a generally belled end member positioned analogously to the cover or shroud 44 or 44'. Of course such machines may also be oriented in different positions.

The invention is also susceptible to variation, modification and change within the fair scope of the subjoined claims.

This Detailed Description of Preferred Forms of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. In a dynamoelectric machine having a rotor, and having a stator assembly including a field iron portion and a field winding portion at one end of the stator assembly, a generally belled cover overlying said field winding portion and secured to the field iron portion at said end of the stator assembly, the novelty which comprises a protector assembly including a holder and a thermally responsive protector retained by said holder, end and side abutment portions on the holder spaced from the protector and engageable by two different portions of the cover of the machine to maintain said protector in close proximity to the winding portion and block movement of the holder and protector away from the winding, said end abutment portion on the holder being engageable by an end portion of the cover and said side abutment portion on the holder engageable by a side abutment portion of the cover.

2. A molded plastic holder for positioning a thermally responsive protector in close proximity to the projecting end turns of the field winding of a dynamoelectric machine of the type having end turns and having a cover over said end turns, said holder having a side portion, a protector holding portion extending substantially perpendicularly laterally in one direction from said side portion and adapted to closely overlie the end of the end turns, and a hook like part on and projecting laterally in the other direction from said side portion, said hook like part being adapted to be interlockingly engageable with an apertured area of said end cover of the machine to maintain the holder and the protector held thereby in close proximity to the end turns.

3. A molded plastic holder as set forth in claim 2 wherein said holder further includes a relatively flat vertical leg adapted to extend beside said end turns.

4. A molded plastic holder as set forth in claim 3 wherein one end of said vertical leg is adapted to cooperate with means projecting from the end of said dynamoelectric machine to support said holder during assembly.

5. A molded plastic holder as set forth in claim 2 further comprising an end abutment portion carried by and projecting substantially vertically from said protector holding portion toward said end cover of the machine when said end cover and said holder are assembled to said machine to restrict movement of said holder and protector away from said end turns and thereby maintain the holder and the protector thereon in close proximity to the end turns.

6. A molded plastic holder for positioning a thermally responsive protector in close proximity to the projecting end turns of the field winding of a dynamoelectric machine, said holder having a side portion including a leg adapted to extend beside the end turns, a protector holding portion extending substantially transversely from the leg, and adapted to closely overlie the ends of the end turns, and a fastening portion on said leg adapted for engagement with a coacting fastening portion carried by the stator to position the holder, a generally annular fastening member adapted to be secured to the stator for securing a cover thereto, said coacting fastening portion for positioning the holder being carried by said fastening member.

7. Overload protection means for a dynamoelectric machine of the type having a rotor, a stator spacedly encircling the rotor, said stator comprising a core and a winding projecting from the core at one end of the machine, a generally belled cover securable to the stator in spacedly overlying relation to the winding at said end of the machine, and a thermally responsive protector unit, characterized by means restrainable and closely overengageable by the cover for maintaining said protector unit in close proximity to said projecting portion of the winding, said last named means comprising a retainer adapted to hold a thermally responsive protector unit, said cover having an abutment portion movable to and from a closely overengaging and restraining position with respect to the retainer during movement of the cover toward and from the end turns in a path parallel to the axis of the rotor.

8. Overload protection means for a dynamoelectric machine of the type having a rotor, a stator spacedly encircling the rotor, said stator comprising a core and a winding projecting from the core at one end of the machine, a generally belled cover securable to the stator in spacedly overlying relation to the winding at said end of the machine, and a thermally responsive protector unit, characterized by means restrainable and closely overengageable by the cover for maintaining said protector unit in close proximity to said projecting portion of the winding, a frame, means including a plurality of screw fasteners for securing the stator to the frame, latchtype cover holding means secured to the stator by said screw fasteners, and coacting latch portions on said cover latchably interengageable with said cover holding means axial movement of the cover to overlying and overengaging relation with respect to said winding and cover holding means.

9. In a dynamoelectric machine including a rotor, a stator including a field iron assembly extending around the rotor, said stator also including a field winding end turn portion of generally annular form and of lesser diameter than the field iron assembly, said end turn portion projecting from the field iron assembly at one end of the stator, an end cover, means including a fastening ring attached to the field iron assembly for securing the cover to said end of the stator in overlying relation to said end turn portion, and a protector assembly including a holder and a thermally responsive protector secured in the holder, characterized by means for securing said holder in a position to maintain the protector in close proximity to the end turn portion including interengageable portions on said holder and ring, interengageable portions on said holder and cover, and intersecured portions on said ring and cover.

10. Means as defined in claim 9 including a tongue upstanding from said ring, said holder having a part interfitted with said tongue, and abutment portions on the cover and holder engageable to maintain interfitted engagement of the tongue and holder.

11. Means as defined in claim 10 wherein the cover is secured by an outer portion of the ring and the tongue projects inside the cover in a direction parallel to the axis of the rotor, said abutment portions being spaced laterally outwardly from the tongue and opposing each other in directions parallel to said axis.

12. Means as defined in claim 9 wherein said means for securing the cover includes latchable holding portions on the ring and cover engageable by moving the cover axially toward the stator.

13. A molded plastic holder for positioning a thermally responsive protector in close proximity to the projecting end turns of the field winding of a dynamoelectric machine of the type having end turns and having a cover over said end turns, said holder having a side portion, a protector holding portion extending substantially perpendicularly laterally in one direction from said side portion and adapted to closely overlie the ends of the end turns, and a side abutment portion on and projecting laterally in the other direction from said side portion, said abutment portion having a neck and a head portion, said head portion being adapted to pass through a first portion of a slot in said cover and said neck portion being adapted to be received in a narrower restraining portion of said slot an end of said narrower slot portion abuts said neck portion and said head portion overlies the outside of said cover.

* * * * *

UNITED STATES PATENT AND TRADEMARK OFFICE
CERTIFICATE OF CORRECTION

PATENT NO. : 4,503,347
DATED : March 5, 1985
INVENTOR(S) : Ernest R. Bergman

It is certified that error appears in the above-identified patent and that said Letters Patent is hereby corrected as shown below:

Column 2, line 8, "subtantially" should be -- substantially --.

Column 5, line 54, "monitor" should be -- motor --.

Column 8, line 34, after "means" insert -- by --.

Signed and Sealed this

Fifteenth Day of April 1986

[SEAL]

Attest:

DONALD J. QUIGG

Attesting Officer      Commissioner of Patents and Trademarks